(12) United States Patent
Zhang et al.

(10) Patent No.: US 7,646,599 B2
(45) Date of Patent: Jan. 12, 2010

(54) LATCH MECHANISM FOR FOLDABLE ELECTRONIC DEVICE

(75) Inventors: Yue-Hai Zhang, Shenzhen (CN); Chien-Li Tsai, Taipei Hsien (TW); Chun-Chi Liang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 70 days.

(21) Appl. No.: 11/556,177

(22) Filed: Nov. 3, 2006

(65) Prior Publication Data
US 2007/0171605 A1    Jul. 26, 2007

(30) Foreign Application Priority Data
Jan. 10, 2006    (CN) .................... 2006 2 0053739 U

(51) Int. Cl.
  *G06F 1/16*   (2006.01)
  *H05K 5/00*   (2006.01)
  *H05K 7/20*   (2006.01)
(52) U.S. Cl. ............................ 361/679.43; 361/679.58; 312/223.1

(58) Field of Classification Search ................. 361/681, 361/682, 683, 725, 726, 679.43, 679.58; 312/223.1, 223.2, 223.3
See application file for complete search history.

(56) References Cited

U.S. PATENT DOCUMENTS

| 6,115,239 | A | 9/2000 | Kim |
| 6,659,516 | B2 * | 12/2003 | Wang et al. .................. 292/251 |
| 6,762,928 | B2 * | 7/2004 | Lo .............................. 361/681 |
| 7,088,588 | B2 * | 8/2006 | Lee ............................. 361/725 |
| 2006/0056140 | A1 * | 3/2006 | Lev ............................. 361/683 |
| 2006/0109637 | A1 * | 5/2006 | Jiang et al. .................. 361/801 |
| 2006/0133019 | A1 * | 6/2006 | Yamazaki et al. ........... 361/683 |

* cited by examiner

*Primary Examiner*—Jeremy C Norris
(74) *Attorney, Agent, or Firm*—Wei Te Chung

(57) ABSTRACT

A latch mechanism for fixing a cover unit to a base unit of a foldable electronic device in a closed position is provided. The cover unit includes two locking portions. The base unit defines two slots. The latch mechanism includes a locking member, and at least one resilient member. The locking member is configured for being slidably received in the base unit. The locking member includes two protrusions. The locking portions of the cover unit extend through the corresponding slots of the base unit, and engage with the corresponding protrusions of the locking member for fixing the cover unit in the closed position. The resilient member is engagable with the locking member, for keeping the locking member in a locked position.

14 Claims, 5 Drawing Sheets

US 7,646,599 B2

LATCH MECHANISM FOR FOLDABLE ELECTRONIC DEVICE

BACKGROUND OF THE INVENTION

1. Field of the Invention

The present invention relates to latch mechanisms, and particularly to a latch mechanism which allows readily opening or closing a cover unit of a foldable electronic device.

2. Description of Related Art

A typical foldable electronic device, such as a notebook computer, includes a base unit, and a cover unit with a rear end pivotably mounted to a rear end of the base unit by hinges. Generally, the notebook computer includes a latch mechanism mounted to a front side of the cover unit for fixing the cover unit to the base unit in a closed position.

As disclosed in U.S. Pat. No. 6,115,239, a latch mechanism for locking a cover unit to a base unit, includes a latch frame movably installed inside the cover unit, a plurality of latches are formed on the latch frame at predetermined intervals and one end portion thereof protrudes from a front surface of the cover unit, and a slide knob is operatively connected to the latch frame for concurrently operating the latches. The latches are inserted into and locked by latch grooves formed at positions corresponding to the latches on an upper surface of the base unit. The latches are urged against the base unit by elastic forces applied by double springs mounted on two ends of the latch frame. However, to open the cover unit, the slide knob is slid to overcome the elastic forces of the springs to move the latch mechanism for disengaging from the base unit. The slide force depends on friction between the slide knob and the fingers of an operator. It is laborious for an operator to provide enough force to move a slide knob.

What is desired, therefore, is a latch mechanism which allows readily opening or closing a cover unit of a foldable electronic device.

SUMMARY OF THE INVENTION

An exemplary latch mechanism for fixing a cover unit to a base unit of a foldable electronic device in a closed position is provided. The cover unit includes two locking portions. The base unit defines two slots. The latch mechanism includes a locking member, and at least one resilient member. The locking member is configured for being slidably received in the base unit. The locking member includes two protrusions. The locking portions of the cover unit extend through the corresponding slots of the base unit, and engage with the corresponding protrusions of the locking member for fixing the cover unit in the closed position. The resilient member is engagable with the locking member, for keeping the locking member in a locked position.

Other advantages and novel features will become more apparent from the following detailed description when taken in conjunction with the accompanying drawings, in which:

DETAILED DESCRIPTION OF THE INVENTION

Figure 1:
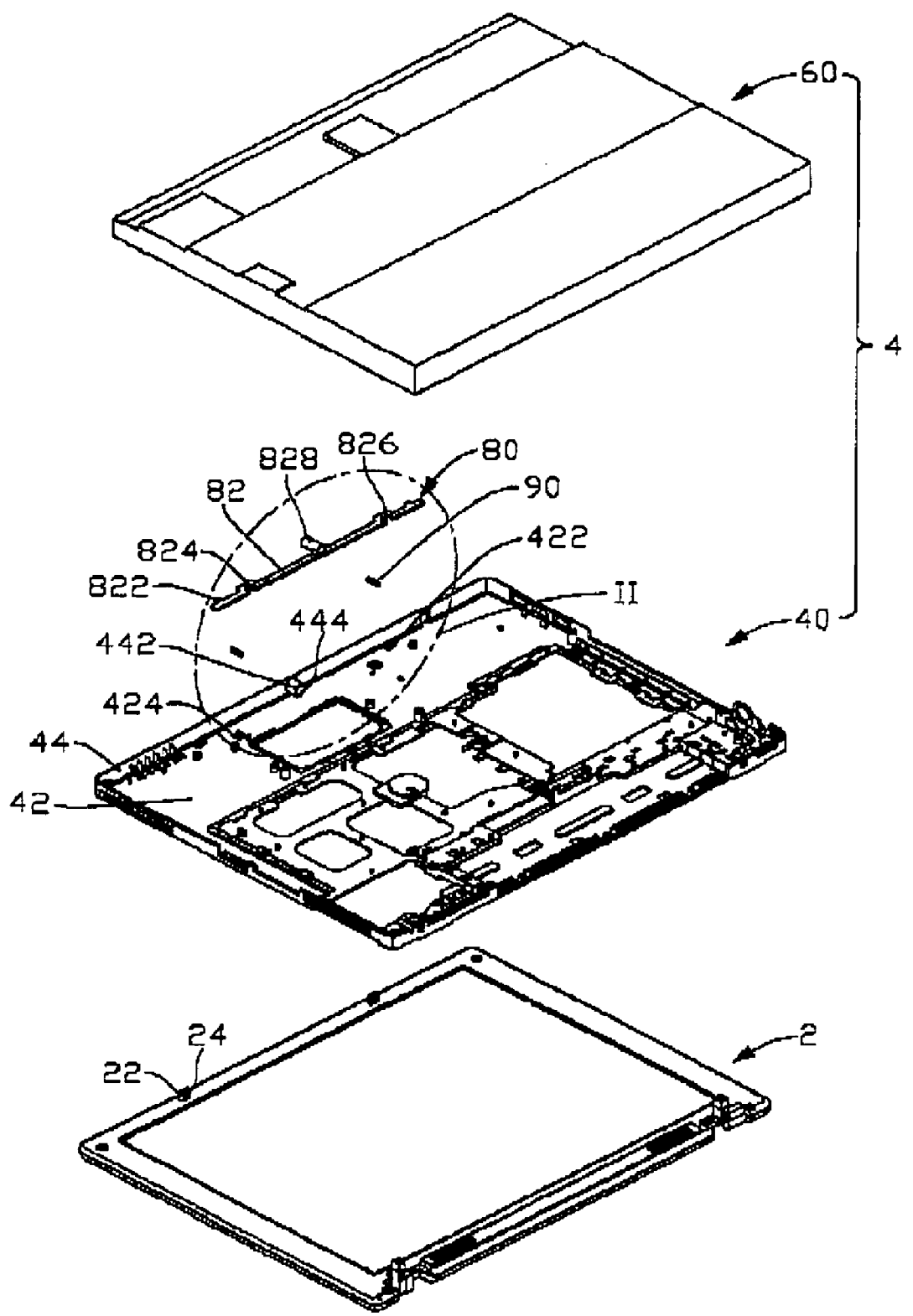
FIG. 1 is an inverted, exploded, isometric view of a foldable electronic device in accordance with a preferred embodiment of the present invention, the foldable electronic device includes a cover unit, a base unit, and a latch mechanism.
Figure 2:
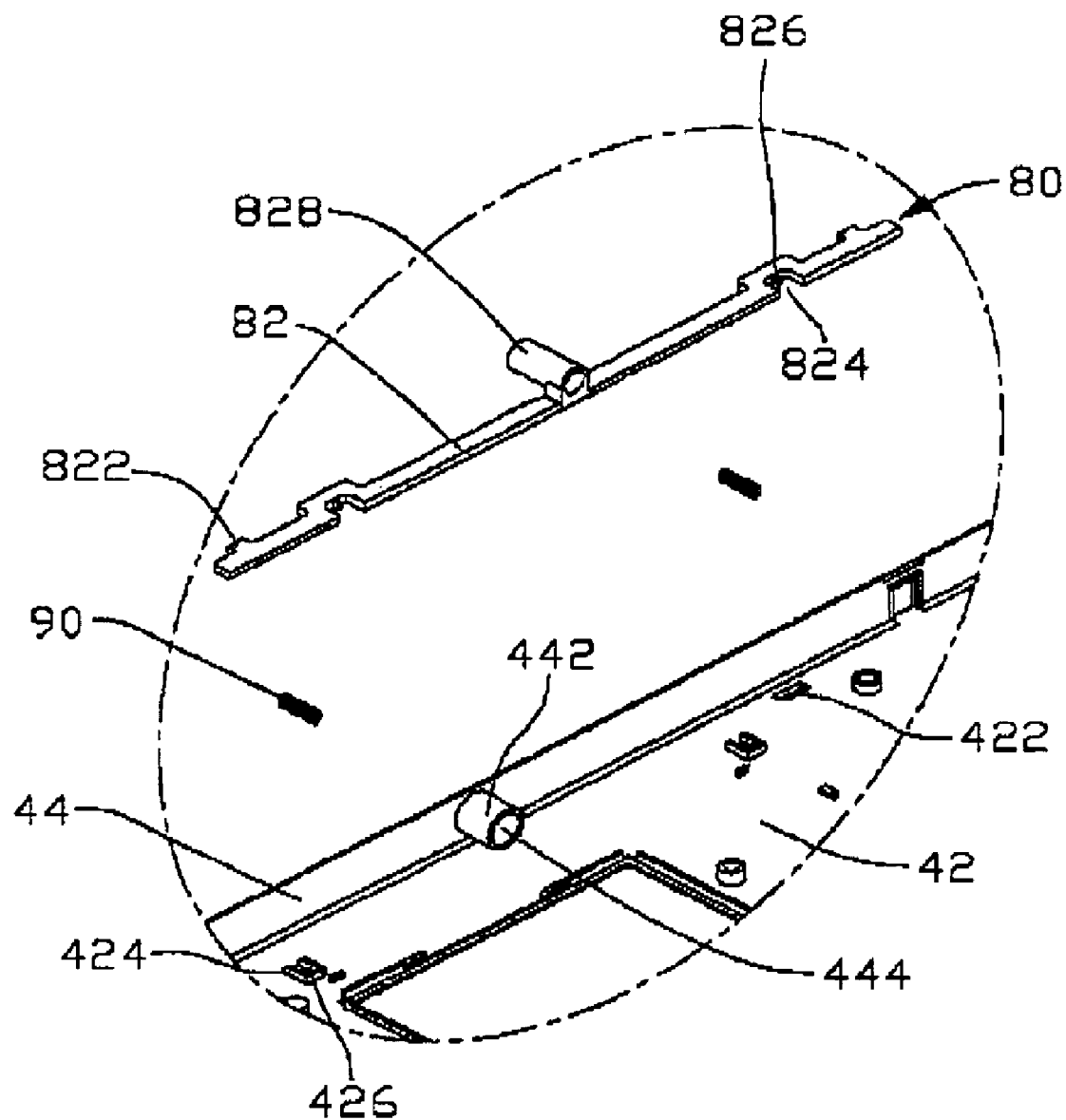
FIG. 2 is an enlarged view of a circled portion II of FIG. 1.

Referring to FIGS. 1 and 2, a foldable electronic device in accordance with a preferred embodiment of the present invention is shown. The foldable electronic device of this embodiment is a notebook computer. The notebook computer includes a base unit 4, a cover unit 2 pivotably mounted to the base unit 4, and a latch mechanism. The latch mechanism includes a locking member 80, and two resilient members 90.

The cover unit 2 includes two locking portions 22 extending from an end thereof. Each locking portion 22 defines a locking hole 24 therein.

The base unit 4 includes a bezel 40, and a chassis 60. The bezel 40 includes a top wall 42, and a sidewall 44 perpendicularly extending from a periphery of the top wall 42 to the chassis 60. Two slots 422 are defined in an edge portion of the top wall 42, adjacent the sidewall 44, corresponding to the locking portions 22. Two U-shaped receiving portions 424 are formed on the top wall 42, adjacent the slots 422. Each receiving portion 424 forms a protruding post 426 on a bottom thereof, extending toward the sidewall 44. The sidewall 44 forms a guide sleeve 442 extending perpendicularly from a middle of an internal side thereof. A through hole 444 is defined through the guide sleeve 442 and the sidewall 44.

The locking member 80 includes an elongated body 82. Two protrusions 822 perpendicularly extend from two end portions of the body 82, corresponding to the locking holes 24 of the cover unit 2. The body 82 defines a cutout 824 adjacent each protrusion 822, corresponding to the receiving portions 424 of the base unit 4. A positioning post 826 is formed on a side of each cutout 824, parallel to the protrusions 822, but extending in an opposite direction. An operating portion 828 extends from a middle of the body 82, corresponding to the through hole 444 of the bezel 40. The operating portion 828 is a post having a central axis parallel to the protrusions 822.

Figure 3:
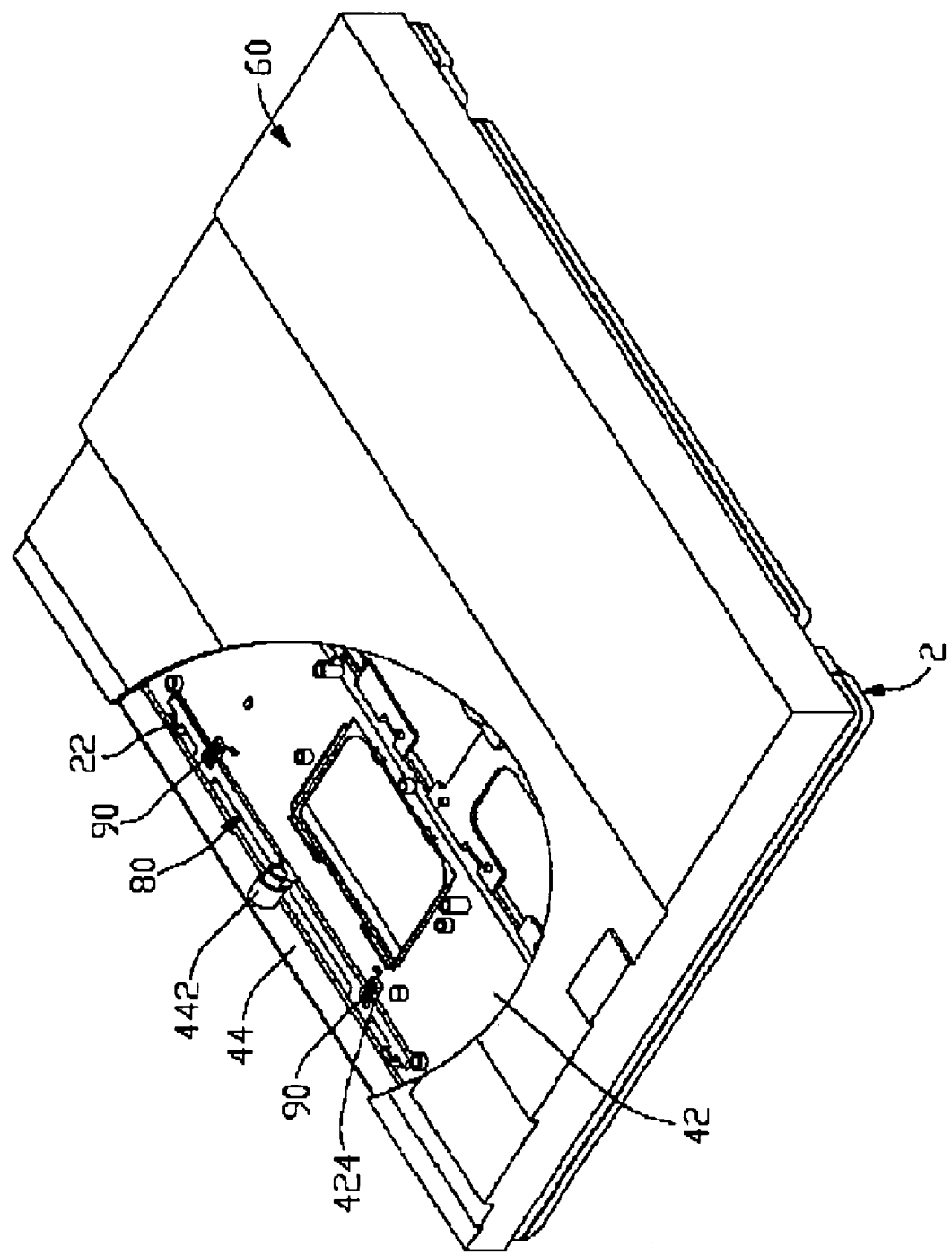
FIG. 3 is an assembled view of FIG. 1, but partially cut away, and showing the latch mechanism in a locked state.
Figure 4:
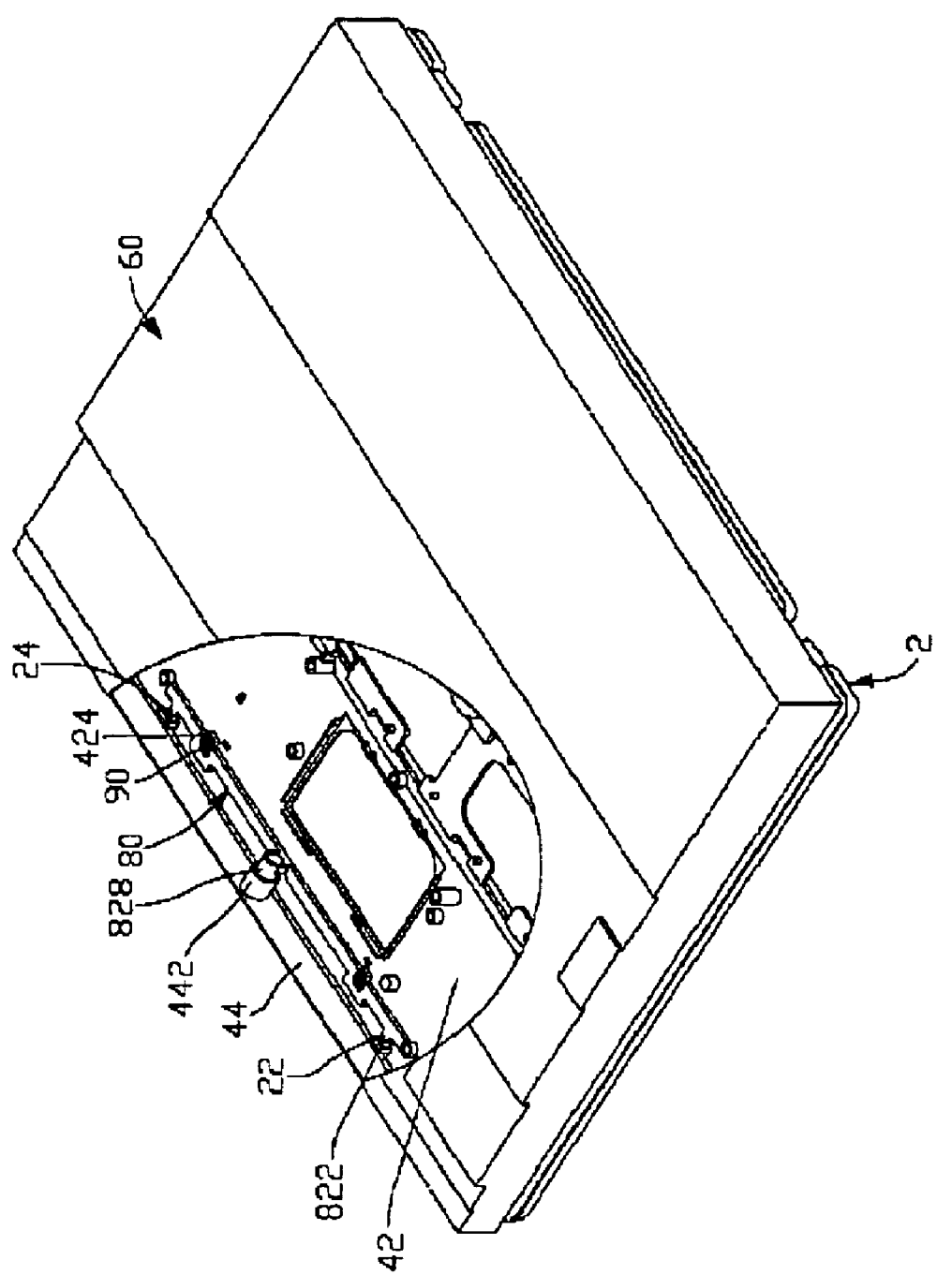
FIG. 4 is similar to FIG. 3, but showing the latch mechanism in an unlocked state.
Figure 5:
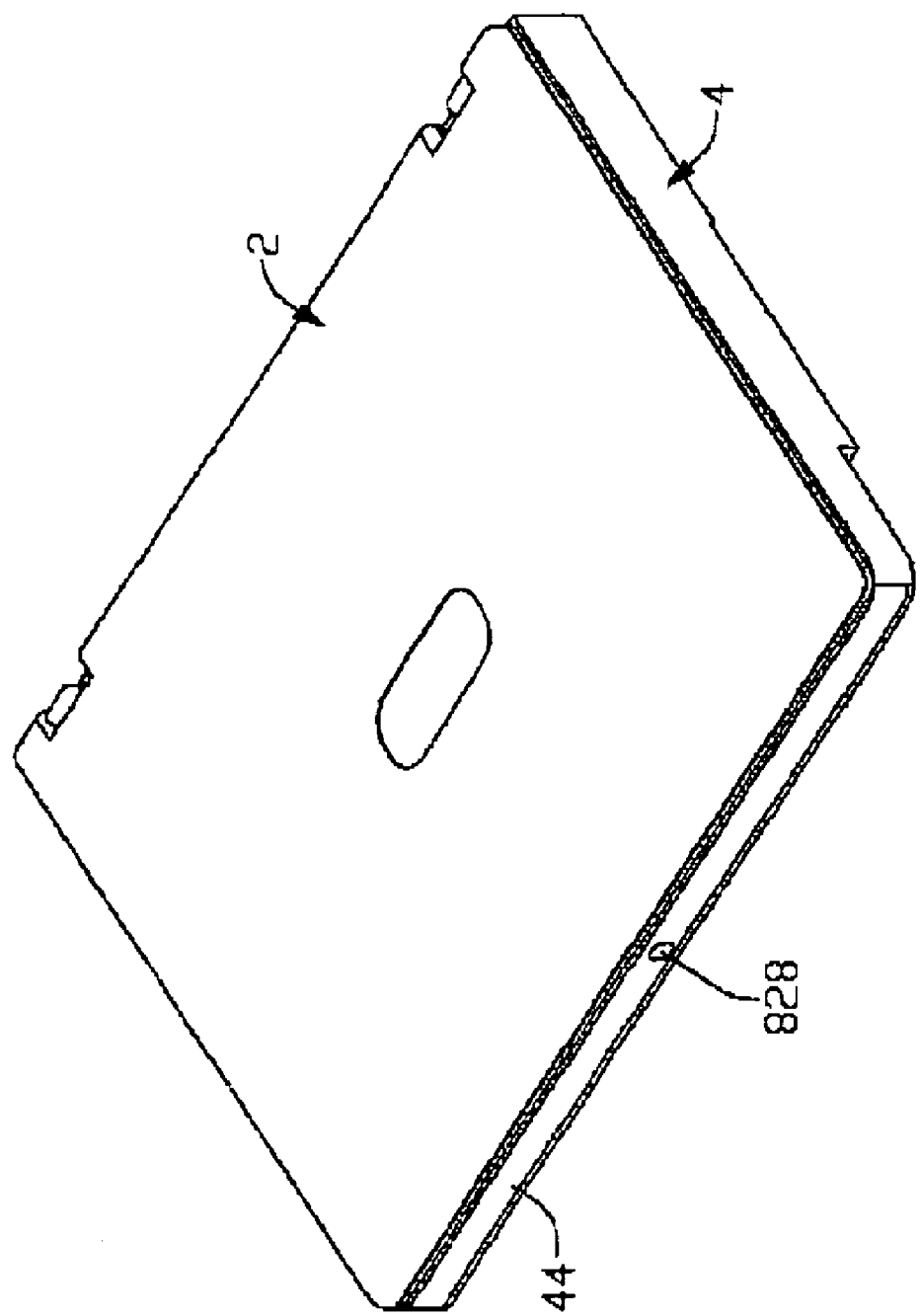
FIG. 5 is an assembled view of the foldable electronic device.

Referring to FIGS. 3 to 5, in assembling the latch mechanism to the bezel 40 of the base unit 4, the operating portion 828 is inserted into the through hole 444 of the guide sleeve 442, and a free end of the operating portion 828 and an outer surface of the sidewall 44 are at a same plane. The resilient members 90 are disposed between the locking member 80 and the corresponding receiving portions 424 of the bezel 40. The resilient members 90 are coil springs in this embodiment, and opposite ends of the resilient members 90 are positioned around the corresponding protruding posts 426 of the bezel 40 and the corresponding positioning posts 826 of the locking member 80, respectively. The protrusions 822 of the locking member 80 align with the corresponding slots 422 of the bezel 40. Thus, the locking member 80 is slidably mounted to the bezel 40 in a locked position. The chassis 60 is then secured to the bezel 40.

The cover unit 2 is pivotably connected to an opposite end of the base unit 4. In closing the cover unit 2 of the notebook computer, the operating portion 828 is pressed to drive the locking member 80 to move away from the sidewall 44. The receiving portions 424 of the top wall 42 are respectively received into the corresponding cutouts 824 of the locking member 80, as shown in FIG. 4. The resilient members 90 are compressed. The cover unit 2 is pivoted to a closed position. The locking portions 22 are inserted into the corresponding slots 422 of the base unit 4. The operating portion 828 is released. The resilient members 90 are restored pushing the locking member 80 to slide back to its locked position, and the receiving portions 424 are respectively removed from the corresponding cutouts 824, as shown in FIG 3. The protrusions 822 are inserted into the corresponding locking holes 24 of the locking portions 22. Thus, the cover unit 2 is secured to the base unit 4.

In opening the cover unit 2, the operating portion 828 is pressed to drive the locking member 80 to move to an unlocked position, as shown in FIG 4. The protrusions 822 of the locking member 80 are withdrawn from the corresponding locking holes 24 of the locking portions 22. Thus, the cover unit 2 is ready to be opened.

In other embodiments, the latch mechanism can be used in other foldable electronic devices, such as a digital video disk (DVD) player.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A latch mechanism for fixing a cover unit to a base unit of a foldable electronic device in a closed position, the cover unit comprising two locking portions, the base unit defining two slots and a through hole between the slots, the base unit forming at least one receiving portion therein, the locking portions of the cover unit extending through the corresponding slots of the base unit in the closed position, the latch mechanism comprising:

an elongated locking member configured for being slidably received in the base unit of the foldable electronic device, the locking member comprising two protrusions configured for engaging with the corresponding locking portions for fixing the cover unit in the closed position, and an operating portion configured for extending out of the base unit through the through hole thereof, for manipulation from outside the base unit, the locking member defining at least one cutout configured for removably receiving the at least one receiving portion of the base unit therein; and at least one resilient member configured for being located in the at least one receiving portion of the base unit and engagable with a side of the at least one cutout of the locking member for keeping the locking member in a locked position.

2. The latch mechanism as claimed in claim 1, wherein the at least one resilient member is a coil spring, a positioning post is formed on the side of the at least one cutout, one free end of the spring is positioned around the positioning post.

3. The latch mechanism as claimed in claim 1, wherein the base unit comprises a sidewall defining the through hole, the locking member is located parallel with the sidewall, and movable in a direction perpendicular to the sidewall via two resilient members located at two opposite sides of the operating portion.

4. A foldable electronic device, comprising:
a base unit defining at least one slot;
a cover unit, with one end thereof pivotably mounted to a corresponding end of the base unit, the cover unit forming at least one locking portion adjacent an opposite end thereof and extending through the at least one slot; and
a latch mechanism mounted to an opposite end of the base unit, the latch mechanism comprising:
a locking member slidably received in the base unit, the locking member having a long narrow shape, comprising at least one protrusion, configured for engaging with the at least one locking portion to fix the cover unit in a closed position, and an operating portion extending out of the base unit, for the locking member to be manipulable from outside the base unit; and
two resilient members respectively located at two opposite sides of the operating portion of the locking member, and disposed between the locking member and the base unit, for restoring the locking member after the locking member is disengaged from the at least one locking portion of the cover unit.

5. The foldable electronic device as claimed in claim 4, wherein the base unit comprises a sidewall defining a through hole, the operating portion is received in the through hole and manipulable from outside the base unit.

6. The foldable electronic device as claimed in claim 5, wherein a guide sleeve perpendicularly extends inward from a middle of the sidewall and communicates with the through hole so that the operating portion is capable of extending through the guide sleeve before entering into the through hole.

7. The foldable electronic device as claimed in claim 5, wherein the at least one locking portion of the cover unit defines a locking hole, the at least one protrusion of the locking member is inserted into the locking hole of the at least one locking portion when the cover unit is in the closed position.

8. The foldable electronic device as claimed in claim 4, wherein the base unit comprises a top plate, the at least one slot is defined in the top plate, the top plate forms at least one receiving portion, the locking member comprises at least one cutout, the at least one resilient member is disposed in a space cooperatively defined by the at least one receiving portion and the at least one cutout.

9. The foldable electronic device as claimed in claim 8, wherein the base unit further comprises a chassis, the locking member being sandwiched between the top plate and the chassis.

10. The foldable electronic device as claimed in claim 9, wherein the at least one resilient member is a coil spring, a protruding post is formed on the at least one receiving portion, a positioning post extends from the locking member to the at least one cutout, two opposite ends of the spring are positioned around the protruding post and the positioning post, respectively.

11. A foldable electronic device comprising:
a base unit defining at least one slot, at least one receiving portion being formed in the base unit;
a cover unit pivotably mounted to the base unit, the cover unit comprising at least one locking portion extending through the at least one slot;
a locking member slidably attached to the base unit, the locking member comprising at least one latch configured for locking with the at least one locking portion to retain the cover unit to the base unit, and an operating portion extending out of the base unit and being pushable inward to drive the locking member to slide from a locked position where the at least one latch is locked with the at least one locking portion to an unlocked position where the at least one latch is unlocked with the at least one locking portion, the locking member defining at least one cutout to removably receive the at least one receiving portion of the base unit therein; and
at least one resilient member disposed between the locking member and the base unit and configured for urging the locking member to slide from the unlocked position back in the locked position.

12. The foldable electronic device as claimed in claim 11, wherein the base unit comprises a chassis and a bezel covering on the chassis, the locking member being disposed between the bezel and the chassis, the cover unit covering the bezel.

13. The foldable electronic device as claimed in claim 12, wherein the at least one receiving portion has a U-shaped profile, and is formed at a surface of the bezel, facing the chassis, and the at least one cutout facing the at least one receiving portion, the at least one resilient member being received in a space cooperatively formed by the at least one cutout and the at least one receiving portion.

14. The foldable electronic device as claimed in claim 11, wherein the at least one resilient member is placed in the at least one receiving portion of the base unit and engaged with an edge of the at least one cutout of the locking member.

* * * * *

UNITED STATES PATENT AND TRADEMARK OFFICE
CERTIFICATE OF CORRECTION

PATENT NO.       : 7,646,599 B2
APPLICATION NO.  : 11/556177
DATED            : January 12, 2010
INVENTOR(S)      : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 81 days.

Signed and Sealed this

Sixteenth Day of November, 2010

David J. Kappos
*Director of the United States Patent and Trademark Office*